United States Patent Office 2,896,709
Patented July 28, 1959

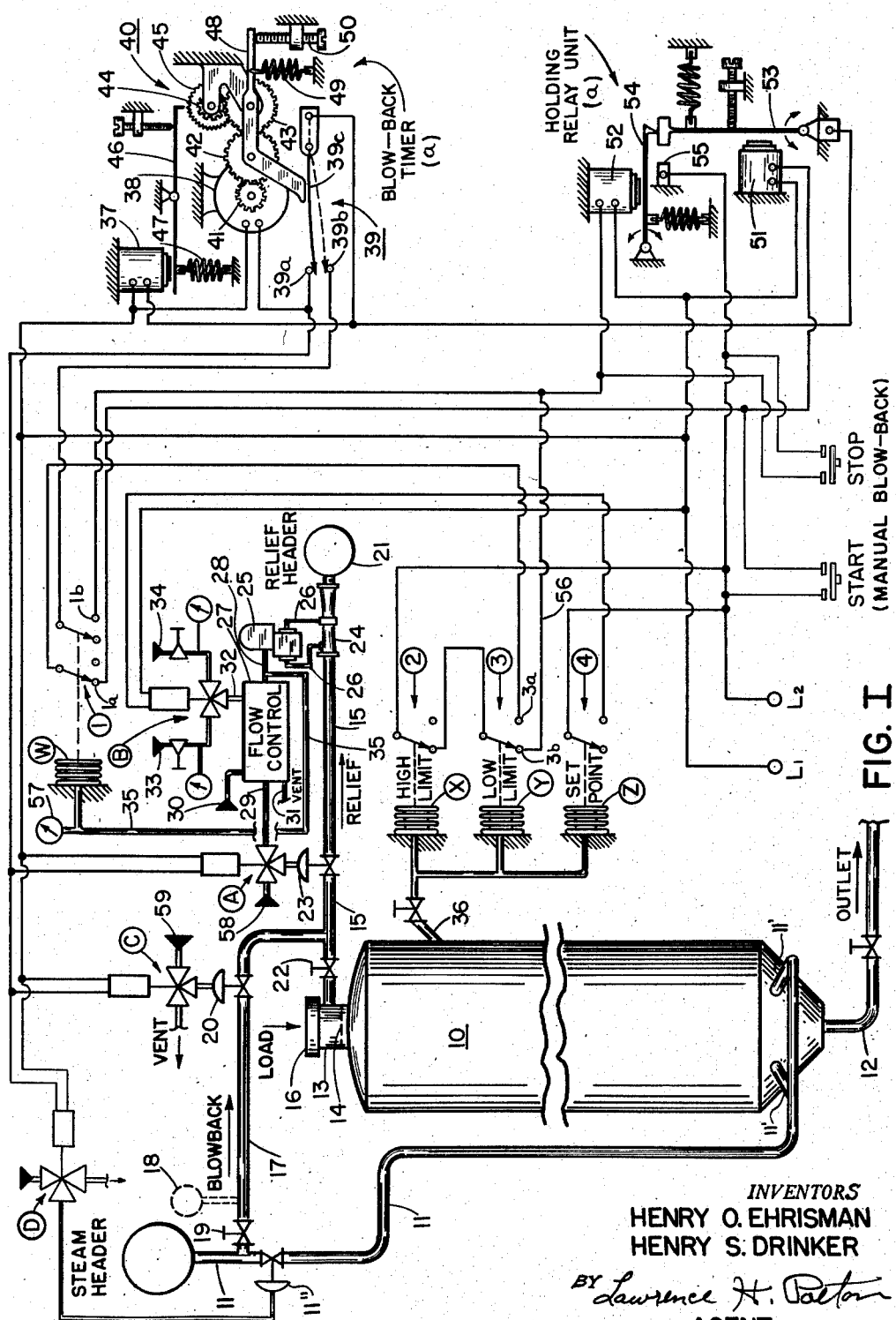

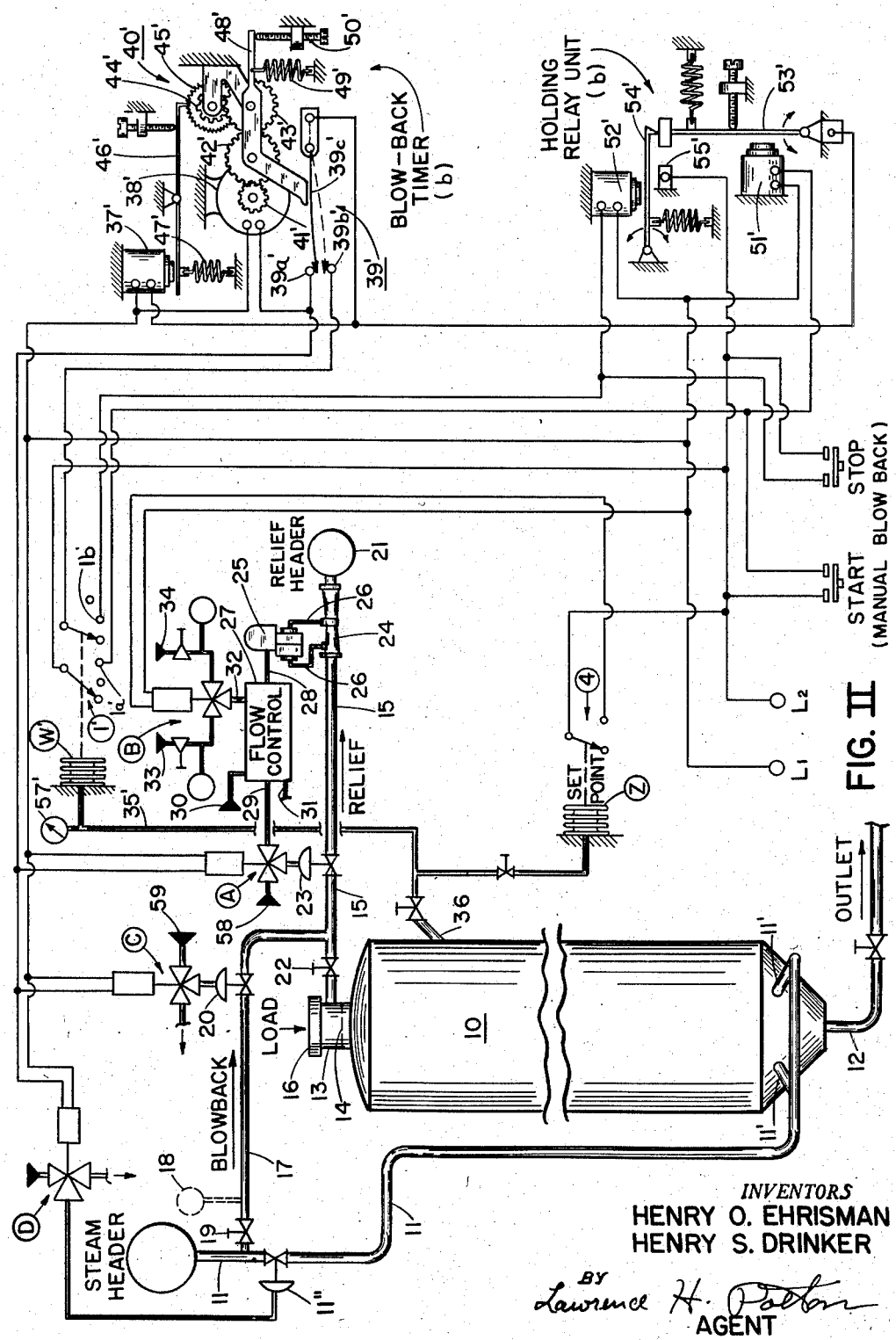

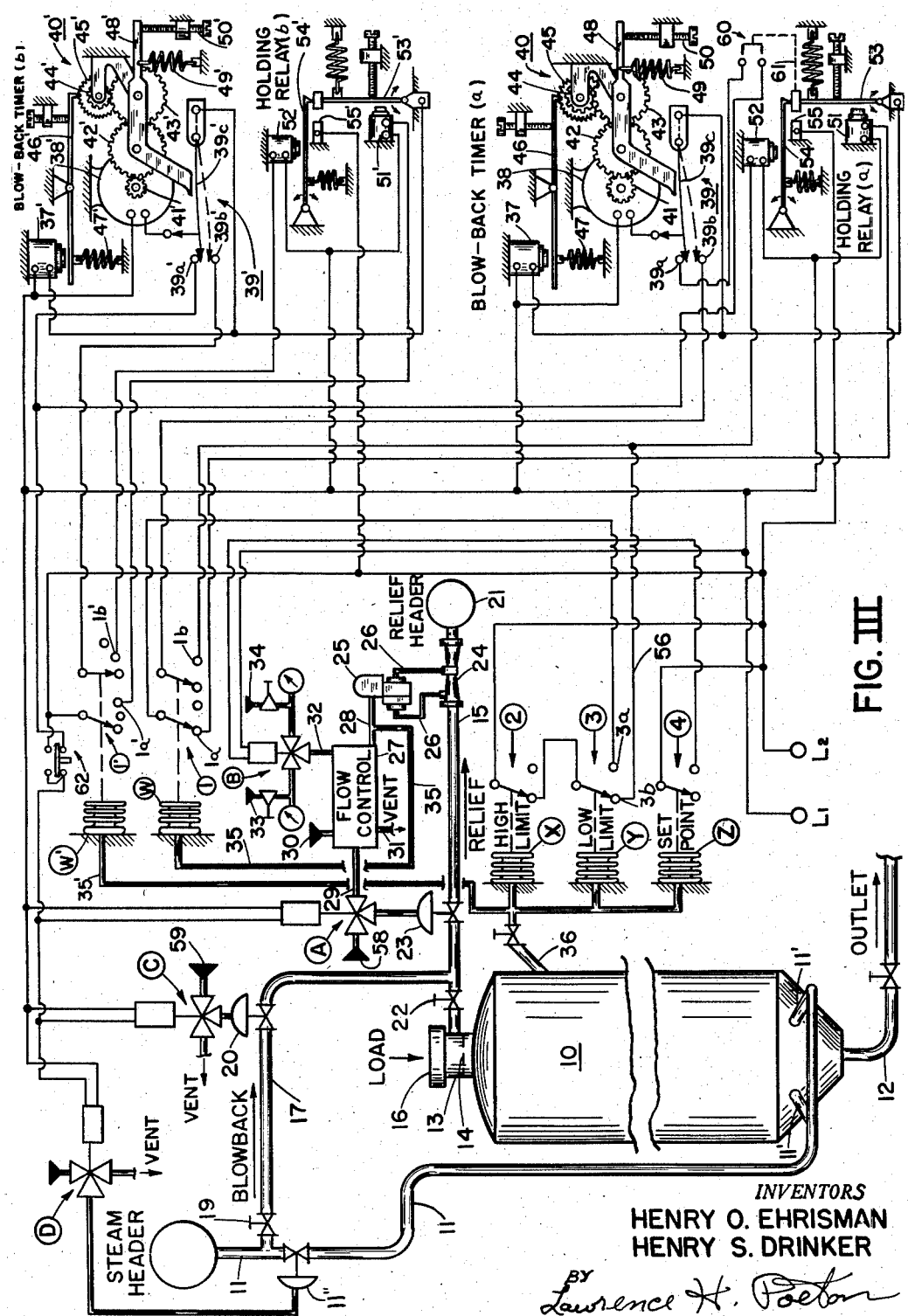

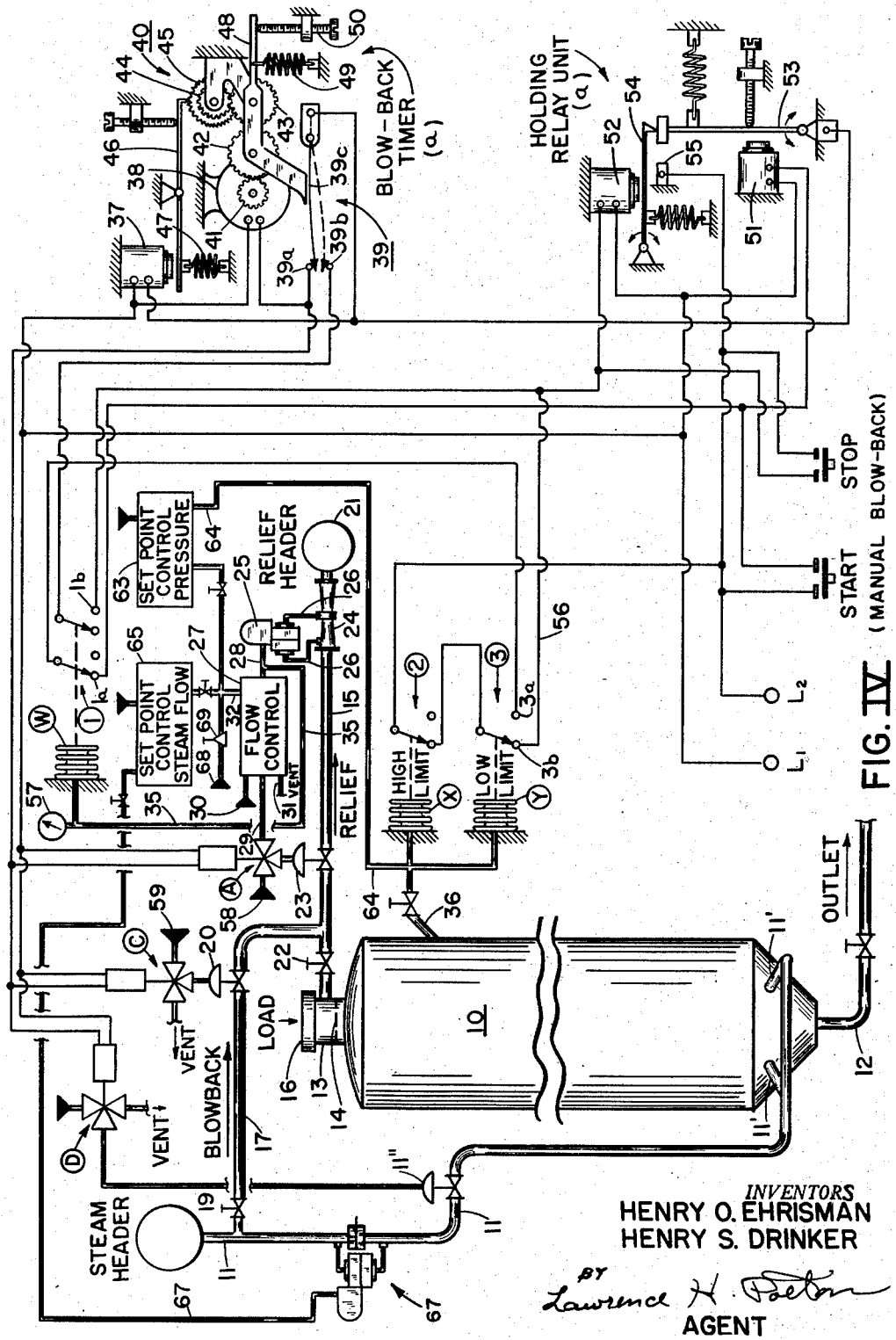

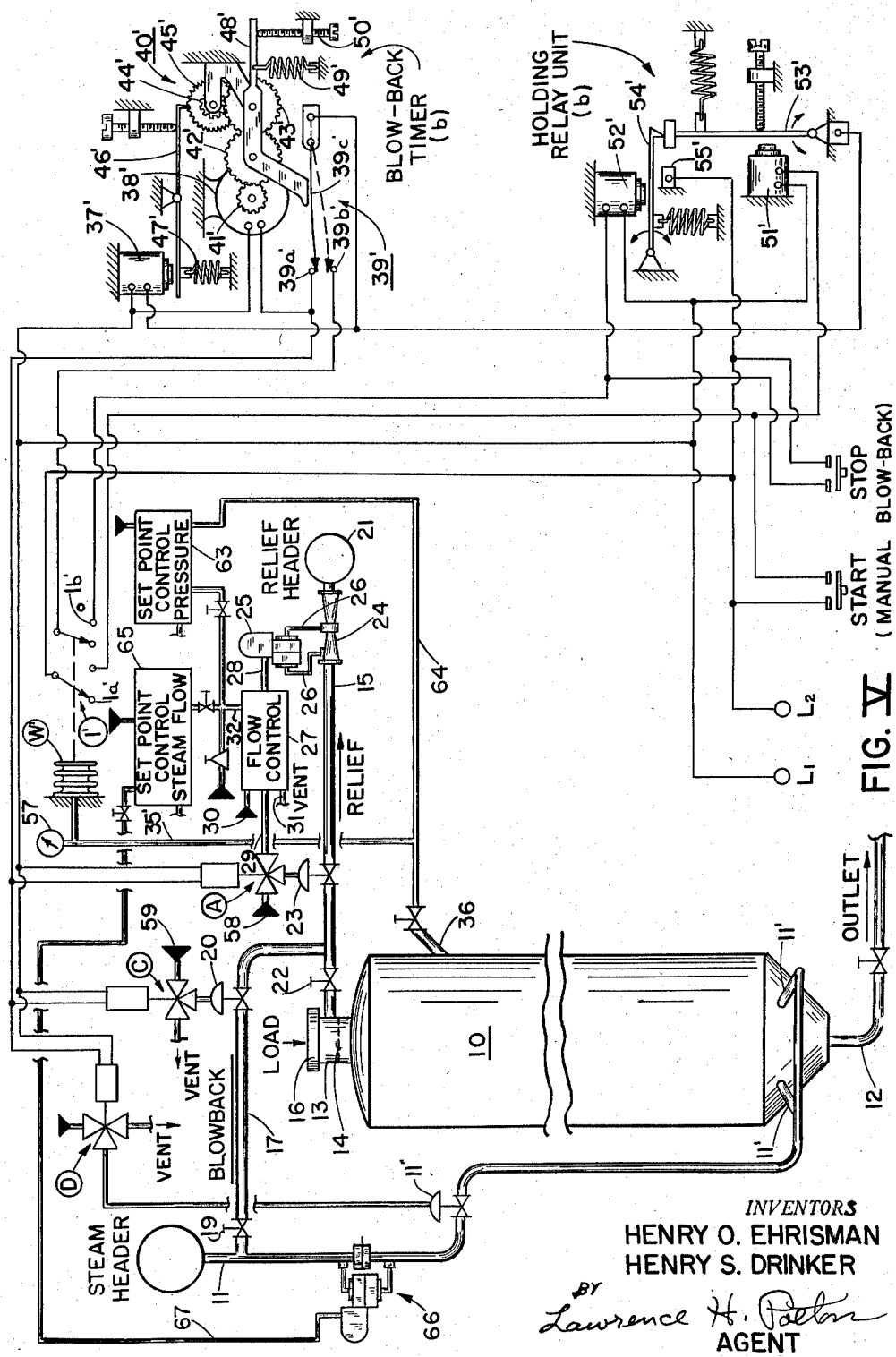

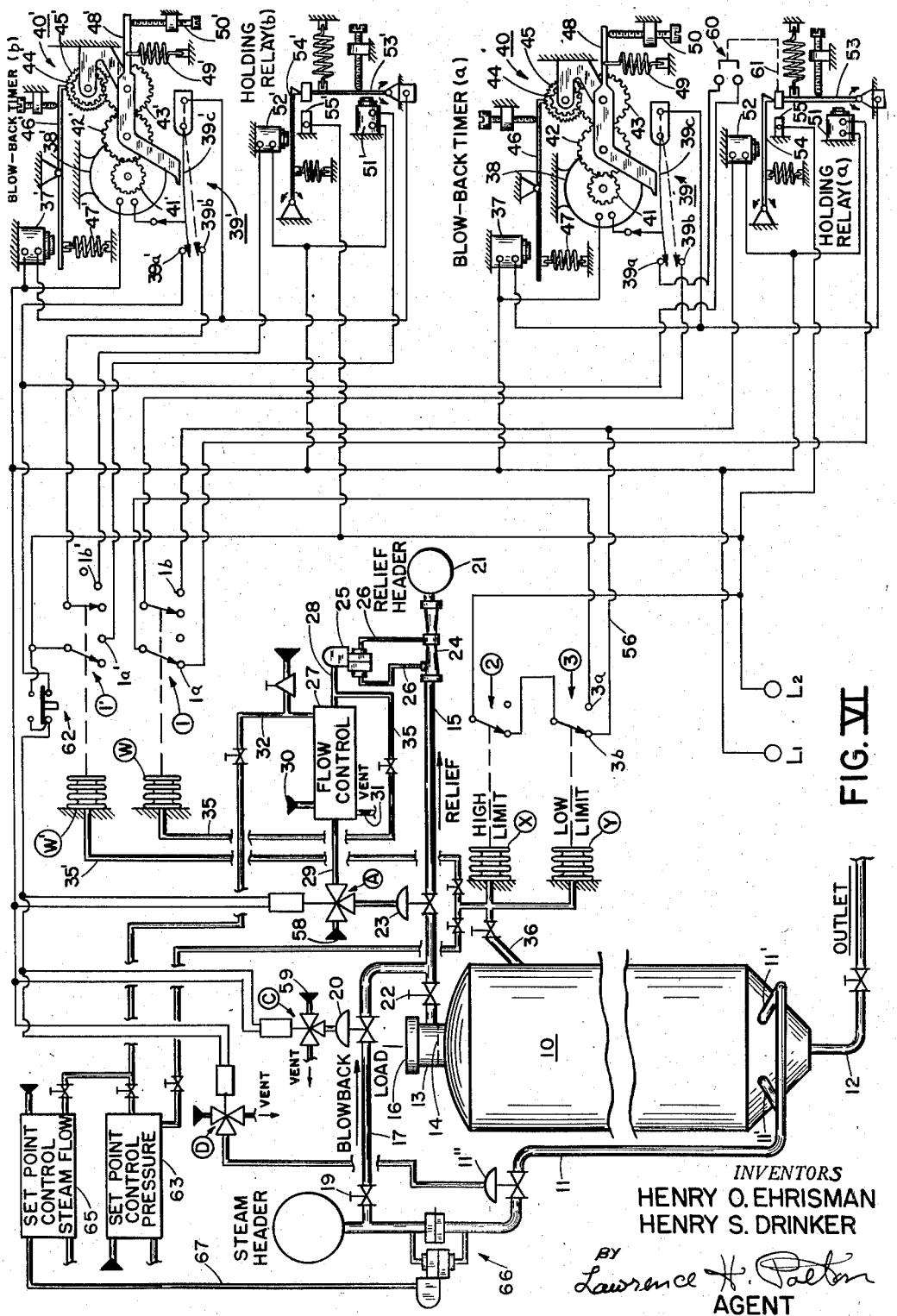

2,896,709

DIGESTER RELIEF SYSTEM

Henry O. Ehrisman, Sharon, and Henry S. Drinker, Concord, Mass., assignors to The Foxboro Company, Foxboro, Mass., a corporation of Massachusetts Application May 11, 1956, Serial No. 584,210

1 Claim. (Cl. 162—238)

This invention relates to the manufacture of paper and has particular reference to digester systems for making paper pulp from wood chips.

In a paper pulp digester, wood in the form of chips is placed in a digester tank and subjected to the action of chemical reagents at elevated temperatures and pressures for a period of hours, the process being known as cooking. To prepare for the cook, the digester tank is charged with wood chips, and sufficient chemical liquor is pumped in to cover the chips. The heating of the digester, usually by steam, may be direct in that live steam may be admitted at the base of the digester and applied directly to the wood chips and liquor therein. An outlet for undesirable gases is provided in the form of a relief opening at the top of the digester tank.

During the cooking process, including the initial heating up of the cook, a considerable quantity of air, which was present in and around the wood chips at the start, is given off, as well as quantities of vapors of turpentine, methyl alcohol, and other volatile materials. It is desirable to remove these vapors as they accumulate in the digester tank so that the continuing release of these undesirables may continue in an efficient cooking manner. Also the air in the tank must be removed since otherwise it tends to form bubbles, particularly near the sides of the digester tank, and these bubbles grow sometimes to relatively large sizes, forming substantial pockets and interfering with the circulation of the liquor and its penetration into the chips. Unless the total pressure in the vapor space at the top of the digester tank is maintained at a relatively low value, these air bubbles do not rise to the surface of the liquor as rapidly as they should, and the resulting pulp contains quantities of uncooked or undercooked chips. Further, unless the gases evolved from the cooking action are removed correctly, there often are sudden outrushings of vapors which tend to cause the liquor to "pull-over" into the vapor relief line, causing loss of liquor and chips.

This invention particularly relates to the relief functions of such digesters, that is, the control of the venting of gases, the control of pull-over, and an associated blow-back arrangement.

This invention provides a calculated stabilizing factor for a digester of the type described in that an automatic flow control system is provided in the relief line. This system is operative to control the relief flow in response to variations in the relief flow itself, and involves a relief flow sensing device, a relief flow control instrument responsive to signals therefrom, and a relief flow control valve operable by the flow control instrument. This system may be arranged to recognize pull-over and to shut down the relief line at such times.

The relief flow control system of this invention also includes a system for varying the set point of the relief flow control instrument mentioned above, either manually as desired, or automatically with respect to variations in pressure in the digester tank. With this arrangement the relief flow can be advantageously varied to adapt the relief flow to different conditions of the digester cook, for example, a relatively large relief flow is desirable during the initial stages of the cook to quickly get rid of the air therein, and a smaller relief flow is desirable when the cook has been stabilized, to remove the undesirable gases and vapors. A digester tank pressure condition may be pre-selected as representative of the point at which such a relief flow change should be made, and the change then made by automatically changing the set point in the relief flow control instrument upon the occurrence of the pre-selected digester tank pressure condition.

A continuous variation of the relief flow control set point may also be provided, under actuation from the variations of the digester tank pressure, or from the variations of the steam input flow to the digester tank, as desired.

The relief flow control system of this invention also includes an automatic blow-back system actuated from a variable condition in the digester system. For example, the blow-back system may be actuated by a relief flow value, or by a digester tank pressure value.

Thus the relief flow control of this invention is provided with associated controls of set point and blow-back, with the actuation of these associated controls arranged with respect to conditions in the digester system which have operative relation to the digester relief function.

The various arrangements mentioned above are usable as a matter of choice with regard to the particular conditions of a specific digester problem. For example, the blow-back system as actuated by a relief flow value is useful because of the screening problem encountered in many digester arrangements. Where a small screen is used in the relief outlet, a screen clogging action often occurs because of partially cooked fibers becoming lodged in the screen, particularly during pull-over conditions or excessive relief flow which may occur when steam "bores" through a cook.

Blow-back as actuated by a digester tank pressure is used to break up steam bubbles which may be formed in the digester tank. Similarly, the set point of the relief flow controller may be continuously varied by either the digester tank pressure or the digester steam supply, according to the needs and relations of a particular digester situation, and in respect to which factor is dominant in the particular situation.

It is an object of this invention to provide a new and improved paper manufacture digester relief system.

Another object is to provide an automatic blow-back system in operative association with a digester relief system.

Other objects and advantages of this invention will be in part apparent and in part pointed out hereinafter and in the accompanying drawings, wherein:

Figure I illustrates a digester relief system according to this invention wherein the relief control set point is arranged for fixed operation, in steps, and wherein the blow-back system is actuable from a low value of the relief flow;

Figure II shows a system like that of Figure I except that the blow-back system is actuable from a specific digester tank pressure value;

Figure III is a combination of the systems of Figures I and II;

Figure IV shows a system like that of Figure I except that the relief control set point is arranged for continuous variation from the digester tank pressure or from the steam input flow to the digester tank;

Figure V shows a system which follows the control set point arrangements of Figure IV and wherein the blow-back system is actuable from a specific digester tank pressure value; and Figure VI shows a system which is a combination of the systems of Figures IV and V.

In the devices according to this invention, as shown in the drawings, all elements are in unenergized condition.

GENERAL DISCUSSION

The central situation of this invention is the relief flow control arrangement made up of relief pipe 15, relief flow sensing system 24, 25, 26, control instrument 27, solenoid relief valve A, and relief flow control valve 23.

An associated feature is the set point arrangement of the flow controller 27, as operated (in Figure I) through solenoid valve B. This set point may be fixed under manual adjustment, it may be adjusted in fixed steps in response to a change in the digester tank (10) pressure (Figures I, II, III), or it may be under continuous adjustment either from the digester tank pressure or from the steam flow input (pipe 11) to the digester tank (Figures IV, V, VI).

A further associated feature is a blow-back system operable through blow-back pipe 17. The blow-back operation may be initiated either by a relief line low flow value (Figures I, IV) primarily as a screen (14) cleaning operation, or by a particular pressure value in the digester tank (10), (Figures II, V) usually under rising pressure conditions, as a means of breaking a bubble in the tank. This invention also includes the conception of a single system (Figures III, VI) wherein blow-back is initiated both from the digester tank pressure and from the relief line flow.

The general operation of the blow-back system is, upon actuation of solenoid valves A, D, and C, to simultaneously shut off the relief line 15 and the steam input line 11 and to open the blow-back line 17, and to start a blow-back timer and actuate a holding relay unit. Unless manually stopped, the timer unit continues the blow-back action for a pre-set period of time. For example, screen cleaning blow-back time as initiated from a low relief flow value, may be of the order of twenty seconds, whereas bubble breaking blow-back time as initiated from a digester tank pressure value, may be of the order of three minutes. At the end of the blow-back time the blow-back timer stops itself and causes the blow-back line 17 to be closed and the relief and steam lines 15 and 11 to be opened. The holding relay remains energized, however, to prevent further blow-back until the digester system readjusts itself to a condition wherein blow-back may again be desirable.

Throughout the various figures, like elements are provided with the same reference numbers.

Figure I

RELIEF CONTROL WITH FIXED ADJUSTMENT SET POINT AND BLOW-BACK FROM RELIEF FLOW

At the left in Figure I, a generally cylindrical paper pulp digester tank 10 is shown. This tank is conventionally provided with a steam supply pipe 11 leading to various steam inlets 11' at the bottom of the tank, and with an outlet pipe 12 from the bottom of the tank for draining out the finished cook. The top of the tank 10 is provided with an upstanding neck 13 with a screen 14 mounted transversely therein. Above the screen 14 a relief pipe 15 leads laterally outward from a point in the tank neck 13 above the screen 14. Above the relief pipe a closure cap 16 is provided for sealing off the top of the tank neck 13. The tank may be loaded by removing the cap 16 and the screen 14 and by pouring wood chips and liquor into the tank through the tank neck 13.

During the operation of the digester, the tank neck screen 14 tends to keep wood chips and fiber out of the relief pipe 15. However, particularly when relatively small relief lines and screens are used, the screen 14 tends to clog up with wood fibers and for this reason a blow-back pipe 17 is provided, from the steam input pipe 11 to the relief pipe 15, as a means of clearing out the tank neck screen 14. This blow-back action is automatic and is caused in this instance, by a low flow value in the relief pipe 15, which in turn results when the screen 14 becomes clogged. In some instances it may be desirable to have a blow-back steam pressure greater than the tank supply pressure in the pipe 11, and in such a case a different steam header 18 may be used to supply the blow-back flow in the pipe 17, with a valve 19 for closing off the blow-back pipe from the tank steam supply pipe 11. Ordinarily, however, the steam input is shut off when the blow-back occurs, and for this purpose a steam valve 11" is shown, operable through a solenoid valve D when blow-back occurs.

The blow-back pipe is provided with a pneumatically operable on-off control valve 20, and the relief pipe 15, which terminates in a relief header 21, is provided with a shut-off valve 22 adjacent the digester tank neck 13. The relief pipe is further provided with a pneumatically operated control valve 23, and a flow sensing element 24 in the form of a venturi tube which is used, rather than an orifice plate, for example, to prevent clogging.

The relief flow through the relief pipe 15 is provided with a flow control system which is responsive to changes in the relief flow itself. This flow control system includes the relief flow sensing element 24 and the relief flow control valve 23, and further, the flow control system includes a conventional differential pressure unit 25 which is connected to the venturi tube 24 in the usual manner by pneumatic pressure pipes 26, a conventional pneumatic flow control unit 27 which is arranged generally in the usual manner, with a pneumatic input pipe 28 from the differential pressure unit 25 and a pneumatic output pipe 29 to the relief flow control valve 23, through a three-way solenoid valve A. The pneumatic control unit 27 is provided with a pneumatic supply 30, a vent 31 to atmosphere, and a pneumatic set point adjustment input 32. The set point adjustment pressure is supplied to the set point input 32 through a three-way solenoid valve B which connects, in this instance, one of two regulated pressure sources 33 and 34, according to a pressure condition in the digester tank 10.

From the differential pressure unit output pipe 28, a pneumatic pressure take-off pipe 35 leads to a bellows W which operates an electrical double switch 1 to initiate the blow-back action, and from the upper portion of the digester tank 10 a pneumatic take-off pipe 36 leads to three belows X, Y, and Z, which respectively operate switches 2, 3, and 4.

The bellows structure described above operates the relief and blow-back control arrangements through an electrical system which will be described hereinafter, and this electrical system leads to a blow-back timer (upper right of the drawing) and a holding relay unit (lower right of the drawing).

FIGURE I TIMER

The above-mentioned blow-back timer comprises a magnetic clutch coil 37, an electric motor 38, a snap-switch 39 with electrical contacts 39a and 39b and a common electrical connection snap-arm 39c, and a gearing and lever system 40.

In the blow-back timer, initially the clutch coil 37 is in de-energized condition, the motor 38 is also in de-energized condition, and the snap-switch 39 is arranged with the snap-arm 39c biased against the contact 39a by the resiliency of the snap-arm itself. The gearing system 40 starts with the direct motor (38) driven, fixed location gear 41 which is arranged in mesh with an intermediate movable location gear 42. The movable location gear 42 is in mesh with another fixed location gear 43 which in turn is meshed with a smaller gear 44, the gear 44 also being fixed in location. Integral with the gear 44 is a larger, sharp toothed clutch wheel 45. The wheel 45 is arranged to be locked against rotation by the angled end of a pivoted clutch lever 46, as dropped into a tooth slot on the periphery of the wheel 45. The clutch lever 46 is biased away from the wheel 45 by a spring 47, and is movable by the clutch coil 37, when energized, about its pivot in a clutch action with respect to the wheel 45. The gear system 40 is provided with a lever 48 which is pivoted about the center of the gear 43 as on a fixed axis. The lever 48 is also pivoted about the center of the intermediate gear 42 as on a movable axis. One end of the lever 48 is arranged to snap-actuate the snap switch 39 by engaging the snap-arm 39c, and the other end is biased by a spring 49 which tends to move the lever away from the snap-arm 39c against an adjustable stop 50.

The operation of the blow-back timer is as follows: in a manner to be explained hereinafter, when the blow-back action is initiated, the clutch coil 37 and the motor 38 are simultaneously energized. Thus the clutch lever 46 is pivoted clockwise and locks the wheel 45 against rotation. Consequently the gears 44 and 43 are also locked. On the other hand the motor gear 41 is rotating, and the gear 42 is consequently rotating and "walking" down along the periphery of the locked gear 43. The amount of movement so produced is regulated so as to maintain the mesh between the gears 41 and 42 and between the gears 42 and 43. As a result, the lever 48 is pivoted counterclockwise about the center of the locked gear 43. The motor 38 is slow, for example, 6 r.p.h., and the lever 48 may thus be in pivotal movement for an appreciable time, with this time period variable as desired by adjustment of the stop 50. When the lever 48 reaches the snap-arm 39c and exerts pressure thereon, the arm 39c is snapped away from the contact 39a and into engagement with the contact 39b and is held there by a lever 48. When the arm 39c snaps away from the contact 39a the motor 38 is de-energized and stops, this being the end of the blow-back period. In this condition the gear system is locked with the snap-arm 39c held in engagement with the contact 39b by the arm 48. However, the clutch coil 37 remains energized, in a holding action to prevent repeated blow-back action while the digester relief flow is building up to "normal" value after a blow-back action. This holding action is terminated when such normal value is reached, as actuated by the relief flow control bellows W and its associated switch 1b. This holding action termination is brought about by the de-energization of the clutch coil 37 and the consequent release of the clutch arm 46, which then is pivoted counterclockwise by its bias spring 47 to release the clutch wheel 45. The gear system then resets itself under the bias action of the spring 49 as follows: the lever 48 is pivoted clockwise by the spring 49 because the gear 43 is now free to rotate, and gear 42 "walks" up the periphery of the now locked motor gear 41. As the lever 48 is so pivoted it moves away from the snap-arm 39c and allows it to snap back against the contact 39a, in readiness for another blow-back action. The lever 48 pivots until it engages the stop 50, and the gear system 40 is thus again in readiness for another blow-back action.

FIGURE I HOLDING RELAY

At the lower right of the drawing, the previously mentioned electrical holding relay unit is shown. This unit is energized and latched at the start of the blow-back action, and is released after a holding period following the blow-back period, as a step in resetting the blow-back timer. The holding relay unit comprises a latching coil 51 and a release coil 52, with a spring biased, pivoted contact arm 53 associated with the latching coil 51, and a spring biased, pivoted latching arm 54 associated with the release coil 52. When the latching coil 51 is energized, the arm 53 is drawn to the coil 51 and into engagement with an electrical contact 55. At the same time the spring biased arm 54, which has been riding on the end of the arm 53, drops behind the arm 53 in a latching arrangement which holds the arm 53 against the contact 55, even after the coil 51 is de-energized. In a releasing action thereafter, the arm 54 is pulled up by the release coil 52 and the arm 53 is thus unlatched and pulled away from the contact 55.

FIGURE I BLOW-BACK

In this instance the actual relief flow, as represented by the pneumatic output of the differential pressure unit 25, through the bellows W and the electrical switch 1 as operated by the bellows W, controls the start of the blow-back action (switch 1a), and the termination of the holding period (switch 1b) after the termination of the blow-back action. The duration of the blow-back action itself is regulated mechanically by adjusting the timing mechanism of the blow-back timer. The adjustment of the set point of the relief flow control is in this instance accomplished in fixed steps by a pressure change in the digester 10. This pressure change is applied to the bellows Z as a means of actuating the electrical switch 4 and consequently operating the three-way solenoid B, thus shifting the effective set point source from one to the other of the sources 33 and 34. This arrangement is for the purpose of holding the relief flow to one value while the digester cook is being started up, and to another value after the cook has been established. Preferably the start-up set point value is higher than the established set point value so that when the cook is started up, the air in the digester may more readily be gotten rid of through the relief pipe 15. The pressure in the digester 10 (and in the bellows Z) at which the set-point change is made, as well as the high and low set point values, are matters of predetermined selection and adjustment, according to the particular circumstances of the cook, i.e., digester size, nature of the liquor and chips in the cook, and like considerations. A blow-back pressure range, as a safety factor, is established by the use of the high and low limit bellows X and Y, operating the switches 2 and 3 respectively, in relation to the pressure in the digester 10. With this arrangement the digester is protected from damage by blow-back, that is, if the pressure in the digester (and in the bellows Y) is too low, the blow-back solenoid valve C cannot be operated because the contact 3a of switch 3 will be open. Similarly, if the pressure in the digester (and in the bellows X) is too high, the blow-back solenoid valve C cannot be operated because switch 2 will be open.

The relief line flow value may be observed in terms of pressure by reference to a pressure indicator 57 in the differential pressure unit output take-off pipe 35.

FIGURE I OPERATION

The operation of this device is as follows: first the digester 10 is loaded with chips and liquor through the digester neck 13, and the screen 14 and closure cap 16 put in place. Then steam is admitted to the digester from the steam header, through pipe 11.

The relief flow control set point is already established for the build-up period for stabilizing the cook in the digester 10 and the bellows Z and its switch 4 drop this set point down when the digester pressure builds up to a predetermined value, without otherwise affecting the relief flow control, and without affecting the blow-back operation.

In the following discussion of the blow-back operation, it is assumed that the digester (10) pressure is above the low limit (bellows Y), and below the high limit (bellows X). Prior to this condition as the digester pressure builds up to the low limit value, the relief flow also builds up and at the low limit value, with the screen 14 clear, the switch 1a is open. If the screen is clogged, the relief flow is low, switch 1a is closed and blow-back will occur as soon as the digester pressure builds up to the low limit value.

During the "normal" operation of the whole system, the relief flow is under the control of the flow control instrument 27, through the valve 23 by way of the three-way solenoid valve A, in response to relief flow through the flow sensing element 24. The blow-back valve 20 is closed. Switch 1a is open, and switches 2 and 3 are both closed. In the blow-back timer, solenoid 37 and the motor 38 are both de-energized, contact 39a is engaged by the snap-arm 39c, and the arm 48 is biased clockwise against its stop 50, with its other end spaced from the snap-arm 39c by the distance it is to travel during the blow-back period.

In the holding relay unit, relays 51 and 52 are both de-energized, contact 55 and contact arm 53 are separated, and the latching arm 54 is resting on the end face of the contact arm 53.

The blow-back action is started when the digester screen 14 gets clogged by pulp fibers. In consequence the relief flow is reduced. At first the flow control attempts to correct this situation by reducing its output pressure and thereby allowing the relief valve 23 to open wider. However, when the relief flow reaches a predetermined low value, the output of the differential pressure unit 25 is reduced to the point at which the bellows W contracts sufficiently to close switch 1a. This results in the simultaneous operation of the three-way solenoid valves A, C, and D and consequently the relief and steam valves 23 and 11" are closed, and the blow-back valve 20 is opened. The blow-back valve 20 is normally closed, and is opened for blow-back action by means of a pneumatic source 59 which is cut in when the blow-back solenoid C is energized. It may be noted in this action that even if the relief valve 23 is larger and slower to close than the blow-back valve 20 is to open, the temporarily increased relief line flow, because of the blow-back through the relief valve 23 as it is closing, will have no effect on the relief valve 23 through the flow control 27 since the operation of the solenoid valve A is to cut off the relief valve 23 from the flow control 27 and to cut in a separate pneumatic source 58 as the means of closing the relief valve 23. The above-mentioned temporarily increased relief line flow causes the differential pressure unit 25 to react and consequently the pressure in the bellows W is increased. As a result, the blow-back initiating contact 1a is temporarily broken and the blow-back terminating contact 1b is temporarily made, but the blow-back action is not affected. The holding relay unit is mechanically locked in at this point in the operation of the device, and the switch 1b is only effective at the end of the blow-back period, when the blow-back timer breaks the contact 39a.

Electrical energy is supplied to this device through lines L1 and L2, as indicated in the drawing, and manual blow-back start and stop switches are shown at the bottom of Figure I.

When the blow-back action is initiated, with the high and low limit switches 2 and 3a closed, and with the switch 1a closed by reduction of pressure in bellows W as described above, the relief, blow-back and steam solenoids A, C, and D are energized through the timer contact 39a and the holding relay contact 55 as follows: switch 1a, as closed, completes a circuit through the holding relay latching solenoid 51, which in turn moves the contact arm 53 into engagement with the contact 55, thereby energizing the solenoids A, C, and D, and in the blow-back timer, both the clutch solenoid 37 directly and the timing motor 38 through the timing contact 39a. In the course of this action the holding unit latching arm 54 drops behind the contact arm 53 to maintain the engagement thereof with contact 55 regardless of whether the coil 51 remains energized.

The above condition is maintained for the duration of the blow-back action, which is calculated and pre-determined for sufficiency in the matter of cleaning the digester screen 14.

As the blow-back timer motor 41 is operated, the lever 48 is moved counterclockwise as previously described herein, because the clutch arm 46 has locked the clutch wheel 45.

The blow-back action is terminated when the timer lever 48 engages the snap-arm 39c and causes it to move away from the contact 39a and into engagement with the contact 39b. As this engagement with the contact 39a is broken, the timing motor (38) driving circuit is broken, and the motor 38 stops, while the clutch solenoid 37 remains energized because the holding relay contact 55 is still engaged, by means of the latching arm 54. This action also de-energizes the relief, blow-back and steam solenoids A, C, and D with the result that the blow-back valve 20 is again closed, the steam input valve 11' is again opened, the relief valve 23 is again put under the control of the flow control 27. In order to prevent further blow-back action while the relief flow is again building up to "normal," the blow-back timer clutch arm 46 still locks the clutch wheel 45. The timer motor being stopped, its gear 41 is locked. Consequently the arm 48 is locked in its "down" position, i.e. holding the snap-arm 39c against the contact 39b. This is made possible by the holding relay unit latching condition of the latching arm 54 with respect to the contact arm 53 and the contact 55 as a means of maintaining the circuit through which the timing clutch coil 37 is energized.

Thus the holding condition, after the blow-back period, is maintained until the relief flow is again built up. The flow control 27 consequently increases its output pressure, with the valve 23 tending to close. At the same time the bellows W is expanded to the point at which the switch 1b is closed. Incidentally, as the switch 1a is opened during this action, the consequent de-energization of the holding unit coil 51 has no effect since the contact 55 and the contact arm 53 are still held together by the latching arm 54. However, when the flow control output switch 1b is closed, the holding unit solenoid coil 52 is energized by way of timer contact 39b and holding relay contact 55, with the result that the latching arm 54 is lifted away from the contact arm 53 which is then pulled away from the contact 55. As a result, the energizing circuit of the timer clutch coil 37 is broken, and the clutch arm 46 releases the clutch wheel 45. The timing gear system 40 accordingly resets itself, and the snap-arm 39c again engages the contact 39a. Incidentally, as the timer snap-arm 39c is allowed to move away from the contact 39b the energizing circuit for the holding unit release coil 52 is broken, and the latching arm 54 drops down against the end face of the contact arm 53. Thus the entire system is again prepared for blow-back action, to be reinitiated when the flow control output pressure again so drops as to close the switch 1a.

At the end of a "cook" in the digester, the relief flow diminishes. It may often happen that the holding relay unit is locked up at this point. For this reason the holding unit release coil 52 is energized through the low limit switch 3, contact 3b, and an electrical lead 56, when the digester pressure is below the low limit pressure set for the bellows Y. Thus the system is prepared for blow-back action at the start of a new cook.

*Figure II*

RELIEF CONTROL WITH FIXED ADJUSTMENT SET POINT AND BLOW-BACK FROM DIGESTER PRESSURE

The system of Figure II is based on the relief line flow control of this invention, and illustrates a combination which differs from that of Figure I only in that the blow-back initiating action is in terms of relief flow affecting digester tank pressure instead of relief flow per se as in Figure I. Thus the combination of Figure II does not need or have the Figure I high and low limit bellows X and Y or the switches 2 and 3 with the circuitry associated therewith.

Further, since the Figure II blow-back action is preferably associated with the start-up action in the digester tank as a means of breaking up air or steam bubbles therein, blow-back is initiated under rising pressure conditions, at a pre-selected point of digester tank pressure. Because of this arrangement the blow-back switch 1' has its contacts 1a' and 1b' differently arranged than the similar contacts of the Figure I switch 1.

In Figure II the digester tank pressure take-off pipe 36 is connected to blow-back bellows W' by means of a pipe 35'. With this arrangement contact 1a' is the blow-back contact and contact 1b' is the holding relay release contact. As the pressure in the digester tank 10 builds up, the bellows W' is expanding. The contact 1b' is temporarily engaged during this build up, but the resulting temporary energization of the holding relay coil 52 has no effect other than to lift and drop the holding relay latching arm 54. The digester tank pressure then continues to increase until the selected blow-back pressure is reached, and at this point the blow-back contact 1a' is engaged, and blow-back proceeds in the manner described in relation to Figure I. In this arrangement a single blow-back action is usually all that is required, and the holding relay is usually kept energized until the end of the cook. An important purpose of the holding relay in this instance is to avoid repeated blow-back action due to minor fluctuation of digester tank pressure with respect to the pre-selected blow-back actuation pressure level. If, however, the digester tank pressure should drop below the blow-back pressure point sufficiently to cause the release contact 1b' to be engaged, the holding relay would be released, and a rising tank pressure would thereafter initiate a second blow-back action upon the occurrence of such tank pressure as would cause the blow-back contact 1a' to be engaged again.

*Figure III*

RELIEF CONTROL WITH FIXED ADJUSTMENT SET POINT AND BLOW-BACK FROM BOTH RELIEF FLOW AND DIGESTER PRESSURE

The system of Figure III is based on the relief line flow control of this invention, and illustrates a combination of the systems of Figures I and II. Thus in the Figure III system, blow-back is initiated both upon the occurrence of a relief flow affecting, pre-selected, rising digester tank pressure, and upon the occurrence of a low flow value in the relief line.

Note that in the Figure III system the digester pressure blow-back system operates through bellows W' and switch 1', and by means of the Blow-Back Timer (b) and the Holding Relay (b). Further, the relief flow blow-back system operates through bellows W and switch 1, and by means of the Blow-Back Timer (a) and the Holding Relay (a).

Much of the circuitry of the Figure III system is common to both blow-back systems, and there is a tendency for each timing device to be operated by the other. To prevent this, the lead to contact 39a in timer (a) is broken and provided with a jumper bar 60 which completes the lead to contact 39a only when the relay (a) is actuated to complete the circuit through contact 55. The jumper bar 60 is operated by means of a non-conductive mechanical connection 61 between the relay arm 53 and the jumper bar 60. The timer (a) will not normally cause the timer (b) to operate since the proper sequence is for timer (b) to be first operated and locked up for the duration of the cook and thereafter timer (a) is operated as called for.

Under like circumstances, as required, the timer (b) may be provided with a jumper bar like 60 in timer (a), in the same manner and for the same purpose, i.e., to prevent timer (b) from being operated by timer (a).

Thus in the operation of the Figure III system, during start-up, a blow-back is called for by the rising digester tank pressure. When this blow-back is completed, the timer (b) is locked up by the holding relay (b).

Thereafter, if the relief line screen 14 becomes clogged and a low relief flow occurs, a blow-back is again called for, this time through bellows W, switch 1, and the combination of timer (a) and holding relay (a). Each of these systems is arranged and operable in the manner shown and described in relation to the respective systems of Figures I and II, here combined.

In the Figure III system, at the top center of the drawing, a manual start-stop switch 62 is provided for manual blow-back when the automatic systems are not in operation.

*Figure IV*

RELIEF CONTROL WITH TWO SYSTEMS OF CONTINUOUS SET POINT ADJUSTMENT AND BLOW-BACK FROM RELIEF FLOW

The system of Figure IV is based on the relief line flow control of this invention, and illustrates the system of Figure I with continuous set point adjustment systems, actuated by relief flow affecting digester operating factors, substituted for the fixed adjustment set point arrangement of Figure I.

In comparing Figures I and IV, note that the Figure I fixed adjustment set point bellows Z, its switch 4, and its associated circuitry are not used in Figure IV. Instead, the relief flow controller 27 has its set point adjustment pneumatic inlet pipe 32 connected with two distinct and separable continuous set point adjustment systems. One of these uses a pressure actuated controller 63, which is responsive to pressure variation in the digester tank 10, through the pressure take-off pipe 36 and a pneumatic connection pipe 64. The other of these set point systems uses a steam flow actuated controller 65 which is responsive to steam flow variations in the steam input pipe 11 by way of an orifice plate differential pressure unit 66 and a pneumatic output connection pipe 67 therefor.

Suitable valving arrangements are provided for adjustment whereby either the steam flow set point system or the digester tank pressure set point system may be used alone. Further, as an adjunct to these systems, a pneumatic source 68 and hand valve 69 arrangement is shown, with valving arrangements to permit it to be used alone, as a means of manually adjusting the set point of the controller 27, continuously or intermittently, as desired.

The set point adjustment arrangement within the relief flow controller 27 is conventional with suitable span adjustment means for relating the device to the particular set point adjustment source which is used. The choice of set point adjustment system and arrangement depends on the particular combination of factors of a specific digester operation, and the systems shown herein are illustrative with respect to combinations involving the flow control arrangement for the relief line 15.

*Figure V*

RELIEF CONTROL WITH TWO SYSTEMS OF CONTINUOUS SET POINT ADJUSTMENT AND BLOW-BACK FROM DIGESTER PRESSURE

The system of Figure V is based on the relief line flow control of this invention, and illustrates the system of Figure II with continuous set point adjustment systems, actuated by relief flow affecting digester operating factors, substituted for the fixed adjustment set point arrangement of Figure II in the same arrangement and manner of substitution as in Figure IV with respect to Figure I.

As a means of orientation of the various system combinations presented herein, it may be noted that Figure V differs from Figure IV in exactly the same respect that Figure II differs from Figure I, that is, the blow-back of the Figure V system is digester pressure actuated, and the blow-back of the Figure IV system is relief flow actuated. Thus Figure V is a new combination of features previously discussed herein.

Figure VI

RELIEF CONTROL WITH TWO SYSTEMS OF CONTINUOUS SET POINT ADJUSTMENT AND BLOW-BACK FROM BOTH RELIEF FLOW AND DIGESTER PRESSURE

The system of Figure VI is based on the relief line flow control of this invention and illustrates a combination of the systems of Figures IV and V in the same manner that Figure III is a combination of the systems of Figures I and II. Thus Figure VI is also a new combination of features previously discussed herein.

The Figure VI system accordingly presents a choice of set point control arrangements through suitable valving adjustments, and it presents a blow-back system operable from relief line flow and a blow-back system operable from a digester tank pressure, in the arrangement and manner discusssed herein with respect to Figure III.

This invention, therefore, provides a new and improved digester relief control system, with illustrative variations thereof.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

We claim:

A paper manufacture digester system wherein a digester tank is charged with wood chips and chemical liquor, and steam is applied thereto in a cooking process whereby gases are given off through a relief system and the wood chips are reduced to paper pulp, said digester system comprising, in combination: a digester tank, a steam supply pipe to the bottom of said tank, a side-wall pressure tap in said digester tank, a parallel arrangement of a high limit bellows, a low limit bellows, and a set point bellows each with a pipe connection to said side-wall pressure tap, a relief pipe extending out from the top of said tank, a blow-back pipe connecting said steam supply pipe to said relief pipe, a steam inlet valve in said steam supply pipe and downstream of the blow-back pipe connection to said steam supply pipe, a blow-back valve in said blow-back pipe, a relief valve in said relief pipe and downstream of the blow-back pipe connection to said relief pipe, a venturi tube in said relief pipe downstream of said relief valve, a differential pressure unit operable through pressure taps in said venturi tube, an output pipe from said differential pressure unit, a blow-back bellows connected to said output pipe, a flow control instrument also connected to said differential pressure unit output pipe, set point adjustment means for said control instrument, electrical means for operating said set point adjustment means in accordance with the action of said set point bellows, an output pipe from said control instrument to said relief valve, a blow-back holding relay unit comprising a starting solenoid, a spring biased contact arm movable by said solenoid to engage a pair of electrical holding relay contacts, a latch arm for holding said contact arm in said contact engaging position, and a holding relay release solenoid for lifting said latch arm to release said contact arm and allow disengagement of said holding relay contacts by said spring bias, a blow-back timer unit comprising a timer holding solenoid, a timer motor with an output driven gear thereon, a floating pivot gear meshed with said driven gear, a fixed pivot gear meshed with said floating pivot gear, a terminal gear unit meshed with said fixed pivot gear, a spring biased latching arm operable by said timer solenoid to engage and immobilize said terminal gear unit, a spring biased timer switch, and a spring biased timer switch actuating lever pivotally mounted on and connecting the center shafts of said floating pivot gear and said fixed pivot gear, whereby actuation of said timer solenoid and said timer motor causes said actuating lever to move to operate said timer switch, an electrical starting circuit for energizing said holding relay starting solenoid and including switches at said blow-back bellows and at said high and low limit bellows, whereby a predetermined low flow in said relief pipe results in actuation of said starting solenoid if the digester tank pressure is between predetermined high and low limits, an electrical blow-back operation circuit which, upon the closing of said holding relay contacts by said starting solenoid, simultaneously provides energization to said steam inlet valve, said blow-back valve, said relief line valve, said timer solenoid, and said timer motor, with all of said operation circuit items except said timer solenoid continued in energization by the maintenance of said timer switch in its unoperated position and by the maintenance of said holding relay contacts in mutual engagement by said holding relay latch arm, and with said timer solenoid continued in energization by the maintenance of said engagement of said holding relay contacts without regard for the action of said timer switch, whereby the starting engagement of said holding relay contacts closes said steam valve, opens said blow-back valve, closes said relief valve, latches said timer terminal gear, and starts said timer motor and said gear train timer lever movement, and a release circuit which is operable in two stages, first by the actuation of said timer switch by said timer lever at the end of a predetermined blow-back period of operation of said timer motor, whereby said valves and said timer motor are de-energized to re-establish the operation of said digester tank and by the holding of said timer switch, as actuated, to prevent new blow-back action before relief flow is again established in said relief pipe, and second, by the actuation of said holding relay release solenoid when a sufficient relief pipe flow expands said blow-back bellows a predetermined amount, whereby said holding relay latch arm is lifted to release said holding relay contacts for disengagement resulting in de-energization of said timer solenoid to allow said timer switch to return to its initial unoperated position, whereby said entire digester system is again in condition for blow-back action upon the occurrence of said predetermined low flow condition in said relief pipe.

References Cited in the file of this patent

UNITED STATES PATENTS

| | | |
|---|---|---|
| 1,308,626 | Crowell | July 1, 1919 |
| 1,411,124 | Nevins | Mar. 28, 1922 |
| 2,395,357 | Trawick | Feb. 19, 1946 |
| 2,451,073 | Cowherd | Oct. 12, 1948 |
| 2,490,533 | McAlear | Dec. 6, 1949 |